US009674754B2

(12) United States Patent
Fitzpatrick et al.

(10) Patent No.: US 9,674,754 B2
(45) Date of Patent: Jun. 6, 2017

(54) METHOD AND SYSTEM FOR HANDOVER OF A USER EQUIPMENT IN CELL BASED NETWORKS (75) Inventors: John Fitzpatrick, West Dublin (IE); Marcus Schoeller, Kronau (DE)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 14/009,404

(22) PCT Filed: Jun. 15, 2012

(86) PCT No.: PCT/EP2012/061446
§ 371 (c)(1),
(2), (4) Date: Oct. 2, 2013

(87) PCT Pub. No.: WO2013/113405
PCT Pub. Date: Aug. 8, 2013

(65) Prior Publication Data
US 2014/0024375 A1    Jan. 23, 2014

(51) Int. Cl.
*H04W 36/00* (2009.01)
*H04W 36/30* (2009.01)
*H04W 84/04* (2009.01)

(52) U.S. Cl.
CPC ....... *H04W 36/30* (2013.01); *H04W 36/0083* (2013.01); *H04W 36/0061* (2013.01); *H04W 84/045* (2013.01)

(58) Field of Classification Search
CPC . H04W 24/10; H04W 36/0055; H04W 36/08; H04B 17/318
(Continued)

(56) References Cited

U.S. PATENT DOCUMENTS 7,200,401 B1    4/2007    Hulkkonen et al.
2006/0194582 A1    8/2006    Cooper
(Continued)

FOREIGN PATENT DOCUMENTS

EP    2 081 324 A1    7/2009
EP    2081324    *    7/2009
(Continued)

OTHER PUBLICATIONS

International Search Report, dated Mar. 22, 2013, from corresponding PCT application.

*Primary Examiner* — Kathy Wang-Hurst
*Assistant Examiner* — Said Elnoubi
(74) *Attorney, Agent, or Firm* — Young & Thompson (57) ABSTRACT A method for handover of a user equipment in cell based networks includes: Detecting a deterioration of a predetermined connection quality for an application on the network connection path between the user equipment and the core network device via the connected base station; Providing backhaul connection information about at least one alternative base station providing at least the predetermined connection quality on its backhaul connection for the application; Blacklisting the connected base station on the user equipment; Providing a removing condition when to remove the connected base station from the blacklist; Requesting a handover of the user equipment from the connected base station to the alternative base station; Handover of the user equipment to the alternative base station if the handover request is accepted; and Handing back the user equipment to the previously connected base station if the removing condition is fulfilled.

20 Claims, 6 Drawing Sheets (58) Field of Classification Search
USPC .................................................. 455/436–444
See application file for complete search history.

(56) References Cited

U.S. PATENT DOCUMENTS

| | | | |
|---|---|---|---|
| 2010/0029278 A1* | 2/2010 | Fang | H04W 36/0055 455/436 |
| 2011/0053599 A1 | 3/2011 | Hsu et al. | |
| 2011/0081903 A1* | 4/2011 | Cai | H04W 36/0055 455/424 |
| 2011/0151877 A1* | 6/2011 | Tafreshi | H04W 36/18 455/442 |
| 2012/0099457 A1* | 4/2012 | Roy | H04W 24/00 370/252 |
| 2012/0170552 A1* | 7/2012 | Oprescu-Surcobe | H04W 28/16 370/332 |
| 2012/0201494 A1* | 8/2012 | Suzuki | G02B 6/3508 385/16 |
| 2012/0202498 A1* | 8/2012 | Sachs | H04W 28/18 455/436 |
| 2012/0244864 A1* | 9/2012 | Fujii | H04W 36/0066 455/436 |
| 2012/0252440 A1* | 10/2012 | Watanabe | H04W 24/02 455/423 |

FOREIGN PATENT DOCUMENTS

| | | | | |
|---|---|---|---|---|
| FR | EP002081324 A1 * | 7/2009 | ......... | H04L 43/0858 |
| FR | EP 2081324 A1 * | 7/2009 | ......... | H04L 43/0858 |
| GB | 2 417 397 A | 2/2006 | | |

\* cited by examiner

METHOD AND SYSTEM FOR HANDOVER OF A USER EQUIPMENT IN CELL BASED NETWORKS

BACKGROUND OF THE INVENTION

Field of the Invention

The present invention relates to a method and system for handover of a user equipment in cell based networks, preferably in a femtocell network, comprising a user equipment, at least two base stations, wherein each base station is assigned to a cell, wherein coverage areas of at least two neighbouring cells are at least partly overlapping and wherein the user equipment is connected to one of the base stations, preferably in form of a femtocell base station, and wherein the at least two base stations are each connected via a backhaul connection to a core network device located in a core network.

Description of the Related Art

Although in general applicable to cell based networks, the present invention will be described with regard to femtocell networks.

The term "connection quality" preferably in the description, in particular in the claims is to be understood as any parameter indicating a predetermined level of quality of a connection. A connection may be in particular established by an application and may be based on IP-flows, bearers, or any other type of traffic aggregate.

In conventional telecommunication network deployments a so-called over-provisioning is used in backhaul connections to core networks in order to guarantee high levels of end-user quality of experience (QoE). With the advent of technologies, such as femtocells, cheap small-bandwidth lines are used to backhaul cellular communications which are shared amongst multiple users and services. Therefore, these backhaul connections may be a "bottleneck" due to their limited capacity when for example a user equipment is connected to a femtocell and further via small bandwidth link, e.g., a DSL link, to a server on the Internet.

When a user starts a quality of service (QoS) sensitive application on his user equipment which is connected to such a femtocell base station, the user may experience poor quality of his application when the quality of service requirements cannot be met by the backhaul connection. Similar a running application on the user equipment may experience a significant deterioration of connection quality, for example if other services increase their network usage.

In US 2011/0053599 A1 a method of a handover procedure is shown: A status of a backhaul connection between an original femtocell base station and a backhaul network is detected and then a handover request message including a reason code and/or flag to at least one mobile station served by the original femtocell base station is sent. The at least one mobile station then reassociates with at least one base station other than the original femtocell base station. A user equipment is therefore handed over to a neighbouring base station, in case the original femtocell base station experiences a backhaul failure or needs to reconfigure used frontend channels by the user equipment. The original femtocell base station sends then a flag to the user equipment and initiates a handover of the user equipment to another base station. The user equipment remains camped on the other base station until the original femtocell sends a callback command to the user equipment via the other base station. The user equipment would then be switched back to the original femtocell base station.

U.S. Pat. No. 7,200,401 B1 shows a communication network system and a method realizing an operator forced handover to another type of radio access network. For example, a speech service is provided for roaming users only via a GSM radio access network. When the connection is established via a UMTS RAN, in case the subscriber is a visiting one, the connection is handed over to the GSM radio access network. The capacity of the UMTS band can then be dedicated preferably to packet data services.

In US 2006/0194582 A1 a method of facilitating a handover from an active network with which a user equipment is in communication to another network is shown: A list of available other networks to said user equipment via the active network is provided. In the user equipment among the available networks based on preference information and signalling to said active network at least one preferred other network is selected. Via the active network neighbour cell information for the at least one preferred other network to said user equipment is provided.

One of the disadvantages of conventional methods and systems is that a modification of the 3GPP standard is required. Another disadvantage is that these conventional methods and systems are limited to macrocell networks.

BRIEF SUMMARY OF THE INVENTION

It is therefore an objective of the present invention to provide a method and a system for a handover of a user equipment in cell based networks which are more flexible in particular with regard to a resources shortages on the backhaul connection.

It is a further objective of the present invention to provide a method and a system of a handover of a user equipment in cell based networks, which are easy to implement and cost-effective.

It is an even further objective of the present invention to provide a method and a system for handover of a user equipment in cell based networks which require minimized amendments to current network standards, in particular regarding the 3GPP standard.

In accordance with the invention the aforementioned objectives are accomplished by a method for handover of a user equipment in cell based networks, preferably in a femtocell network, comprising a user equipment, at least two base stations, wherein each base station is assigned to a cell, wherein coverage areas of at least two neighbouring cells are at least partly overlapping and wherein the user equipment is connected to one of the base stations, preferably in form of a femtocell base station, and wherein the at least two base stations are connected via a backhaul connection to a core network device, located in a core network.

According to the present invention, such a method is characterized by the steps of a) Detecting a deterioration of a provided connection quality compared to a predetermined connection quality for an application on the network connection path between the user equipment and the core network device via the connected base station, b) Providing backhaul connection information about at least one alternative base station providing at least the predetermined connection quality on its backhaul connection for the application, c1) Blacklisting the connected base station on the user equipment, c2) Providing a removing condition when to remove the connected base station from the blacklist, d1) Requesting a handover of the user equipment from the connected base station to the alternative base station, d2) Handover of the user equipment to the alternative base station if request according to step d1) is accepted, e) Handing back the user equipment to the previously connected base station if the removing condition according to step c2) is fulfilled.

In accordance with the invention the aforementioned objectives are also accomplished by a system for handover of a user equipment in cell based networks, preferably in a femtocell network and preferably for performing a method according to the present invention, including a user equipment, at least two base stations, wherein each base station is assigned to a cell, wherein coverage areas of at least two neighbouring cells are at least partly overlapping and wherein the user equipment is connected to one of the base stations, preferably in form of a femtocell base station, and wherein the at least two base stations are each connected via a backhaul connection to a core network device, located in a core network.

According to the present invention, such a system is characterized by determination means operable to detect a deterioration of the predetermined connection quality for an application in the backhaul connection on the network connection path between the user equipment and the core network device via the connected base station, providing means operable to provide backhaul connection information about at least one alternative base station providing at least the predetermined connection quality on its backhaul connection listing means operable to blacklist the connected base station on the user equipment, removing condition means operable to provide a condition when to remove the connected base station from the blacklist and handover means operable to request a handover, to handover the user equipment from the connected base station to the alternative base station if a requested handover is accepted, and to hand back the user equipment to the previously connected base station.

According to the invention it has first been recognized that the method and the system of the present invention are more flexible, since a user equipment connected to a base station can be temporarily hand off to a neighbouring cell when the base station's backhaul link cannot meet the Quality of Service (QoS) requirements of an ongoing application anymore. The user equipment may preferably reside on the neighbouring cell as long as the QoS susceptible application is running and may return to this base station when for example the application has terminated and the user equipment is still in communication range of this base station.

According to the invention it has further been first recognized, that the method and the system of the present invention require no adaption or modification of the 3GPP standard, since the blacklisting of the connected base station may be enabled without modification.

According to the invention it has further been first recognized, that the method and the system of the present invention are cost effective and easy to implement, requiring only few modifications to existing methods and systems while applicable for a plurality of base stations of different network types. For example, when the cell owner and the mobile operator have agreed on any form of revenue sharing for offloading traffic from the mobile operator's macrocell network the user equipment may be allowed to come back as early as possible.

Further advantages, features and preferred embodiments of the present invention are described in the following subclaims.

According to a preferred embodiment the user equipment relays the backhaul connection information of neighbouring cells to its connected base station according to step b). This enables a fast and easy provision of the information when the backhaul connection information is added to pilot channel data: The user equipment may provide this information in a normal measurement report sent from the user equipment to the connected base station. Via a pilot channel network operator identifier, area identifier and backhaul connection identifier or the like are exchanged between the user equipment and a base station.

According to a further preferred embodiment a core network entity and/or the user equipment detects a deterioration according to step a). The user equipment on the one hand may detect deterioration according to step a) for example by monitoring an application or transport layer protocol. The user equipment may monitor metrics such as transport retransmissions, packet loss, delay, jitter, and codec adaption, thereby detecting potential quality degradation or deterioration of the connection quality. On the other hand, the core network entity may detect deterioration for example by also monitoring the application or the transport layer protocol, or by monitoring on lower layers, e.g., Internet Protocol (IP) layer or Media Access Control (MAC) layer or by observing traffic aggregates such as a specific bearer, e.g. GTP-U tunnel information. If the user equipment detects the deterioration an easy and quick detection is possible since an application of the user equipment usually monitors metrics of the connection. If a core network entity detects the deterioration a more precise detection is possible, for example when combined with the corresponding information of the user equipment.

According to a further preferred embodiment a core network entity performs deep packet inspection for detecting a deterioration according to step a). Deep packet inspection provides examining not only the header part, but also the data part of a (data) packet enabling a more reliable detection of a deterioration of the connection quality.

According to a further preferred embodiment backhaul connection information is provided by a backhaul provider and is alternatively or additionally used to detect a deterioration in the provided connection quality. If such information is provided by a backhaul provider, for example a fixed line operator, detecting a deterioration according to step a) may be more precise and/or efficient, since a fixed line operator usually determines or monitors congestion in its network or connections. The backhaul provider may provide this information then to the corresponding mobile operator of the base stations. Detecting the deterioration by the backhaul provider may be performed by fixed/mobile conversions standards such as the Policy and Charging Rules Function-Broadband Policy Control Framework (PCRF-BPCF) interworking function currently being defined by the 3GPP and Broadband Forum.

According to a further preferred embodiment the removing condition according to step c2) includes application activity information and/or deblacklisting timing information and/or bearer or IP-flow information. Deblacklisting timing information include a time period when to remove the connected base station from the blacklist. This enables for example an un-blacklisting of the connected base station without necessarily waiting for a specific application or flow to end. A further advantage is that if IP-flow information is included no explicit termination signal from an application is necessary thus enabling a faster handing back with reduced data exchange.

According to a further preferred embodiment the connection quality includes quality of service information and/or quality of experience information. This enables a specification of the transport of data traffic with special requirements. Quality of service is defined by requirements such as response time, loss, signal-to-noise ratio, cross-talk, echo, interrupts, frequency response, loudness levels, etc. Quality of experience or quality of user experience is a subjective measure of all customer's experiences with a service, like web-browsing, phone calls, TV broadcast, calls to a call centre or the like. Quality of experience in telecommunication networks is a subjective measure from the user's perspective of the overall value of the service provided, including suitableness, flexibility, mobility, security, costs, personalization and enjoy of the provided services. Both quality of service and quality of experience are important parameters defining inter alia the connection quality.

According to a further preferred embodiment the handover according to step d) is performed to an alternative base station having a different backhaul connection to the core network device. This avoids the following scenario: When assuming that only the femtocell base station to which the user equipment is being handed off would be blacklisted, it would be possible for the user equipment to attempt a handover to an alternative femtocell base station which uses the same backhaul connection having the same resource constrains with regard to the connection quality. Handing over to an alternative base station having a different backhaul connection prevents the user equipment from being moved to an alternative femtocell suffering the same quality problems as the already connected base station.

According to a further preferred embodiment the backhaul connection information is provided by each of the base stations and exchanged between different neighbouring base stations. This enables the connected base station, for example to only send a handover request to a neighbouring base station from whom it knows that is has sufficient backhaul connection resources to handle the user equipment and its applications or flows.

According to a further preferred embodiment the backhaul connection information is exchanged via an X2-like interface between the base stations and/or via a data base storing backhaul connection information of different base stations and/or via a report transmitted to the connected base station wherein the user equipment adds the backhaul connection information to the report. This enhances further the flexibility of the method providing different methods for exchanging backhaul connection information.

According to a further preferred embodiment step c) is performed for all base stations having the same backhaul connection as the connected base station. This provides a very easy way to prevent the user equipment from being handed over to an alternative base station only to suffer same connection quality problems due to the deterioration of the quality of the backhaul connection. For example this could be achieved by allowing a core network entity, preferably a femtocell gateway to provide the base stations with a list of all other base stations sharing the same backhaul connection resource.

According to a further preferred embodiment the connected base station is provided in form of a relay node wherein the relay node is connected to the at least one alternative base station. This enables the cell based network to load-balance between the relay node and the macro-cellular network while providing better quality of experience for the end users.

According to a further preferred embodiment step c) is performed by removing the connected base station from a measurement report transmitted to the connected base station. This enables a fast and easy way to blacklist the connected base station, since measurement reports are exchanged between user equipment and connected base station regularly.

According to a further preferred embodiment a core network entity obtains the backhaul connection information by observing a source IP address of an IPSec tunnel between a base station and the core network entity, wherein the core network entity is preferably provided in form of a femtocell gateway. This provides a centralized instance for providing backhaul connection information and for determining this information in an easy way, when for example the core network entity is connected to the base stations via an IPSec tunnel routed over the public internet.

According to a further preferred embodiment of the system, the connected base station is provided in form of a relay station of the alternative base station. This enables the cell based network to load balance between the relay node and the macro cellular network while providing better quality of experience for the end users. This also reduces a call blocking probability during periods of congestion.

There are several ways how to design and further develop the teaching of the present invention in an advantageous way. To this end it is to be referred to the patent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained.

DETAILED DESCRIPTION OF THE PREFERRED EMBODIMENTS

Figure 1:
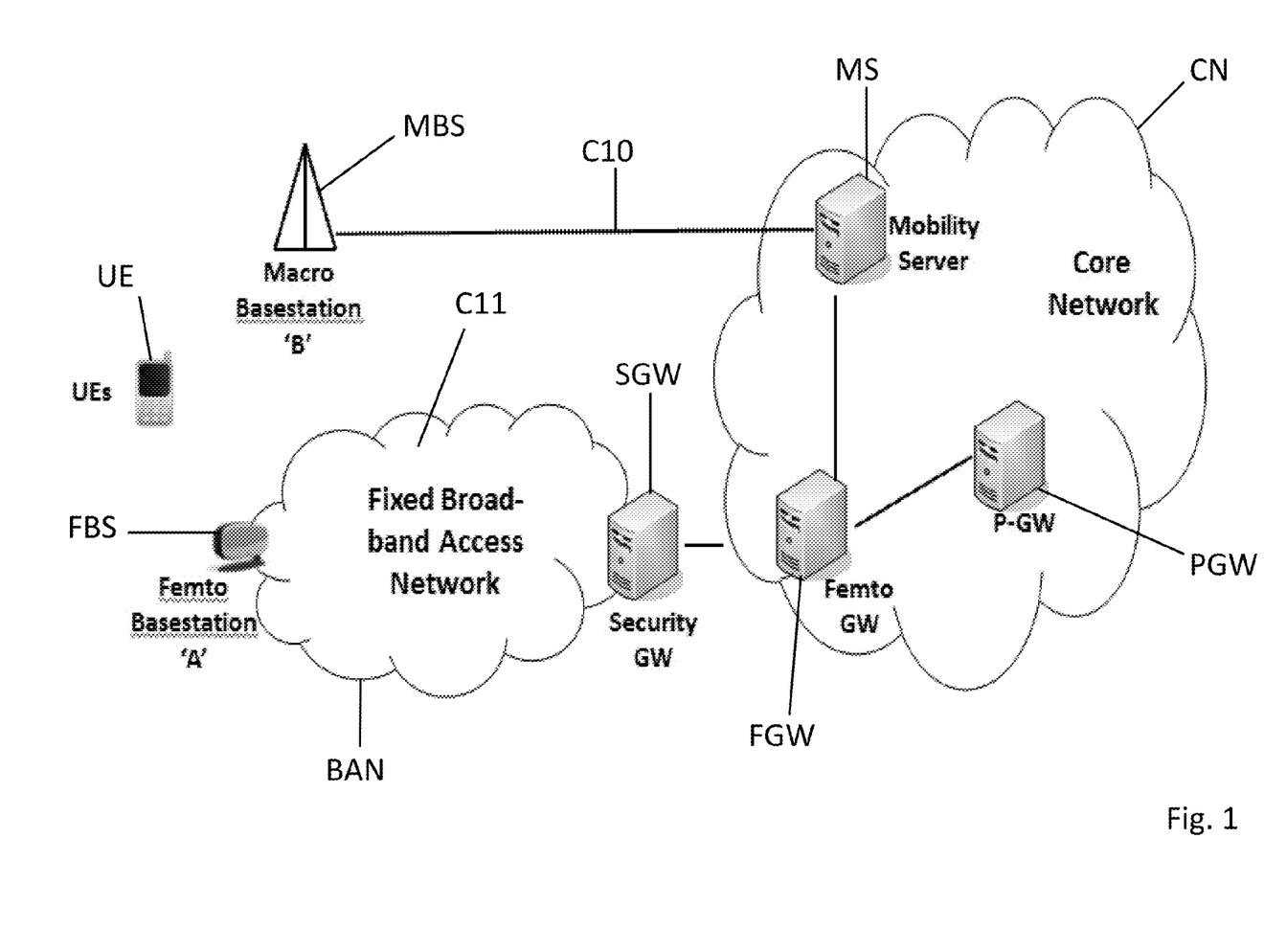
FIG. 1 shows a system according to a first embodiment of the present invention.

FIG. 1 shows a system according to a first embodiment of the present invention.

FIG. 1 shows a femtocell network architecture. A macro base station MBS is connected via a first connection C10 to a mobility server MS which is located in a core network CN. The mobility server MS is connected via a femto gateway FGW to a packet data gateway PGW. The femtocell base station FBS is connected by a fixed broadband access network BAN via a second connection C11 to a security gateway SGW. The security gateway SGW is further connected to the femtocell gateway FGW and the packet data gateway PGW located in the core network CN. A user equipment UE may be either connected to the femtocell base station FBS or to the macro cell base station MBS to exchange data with the packet data gateway PGW located in the core network CN.

Figure 2:
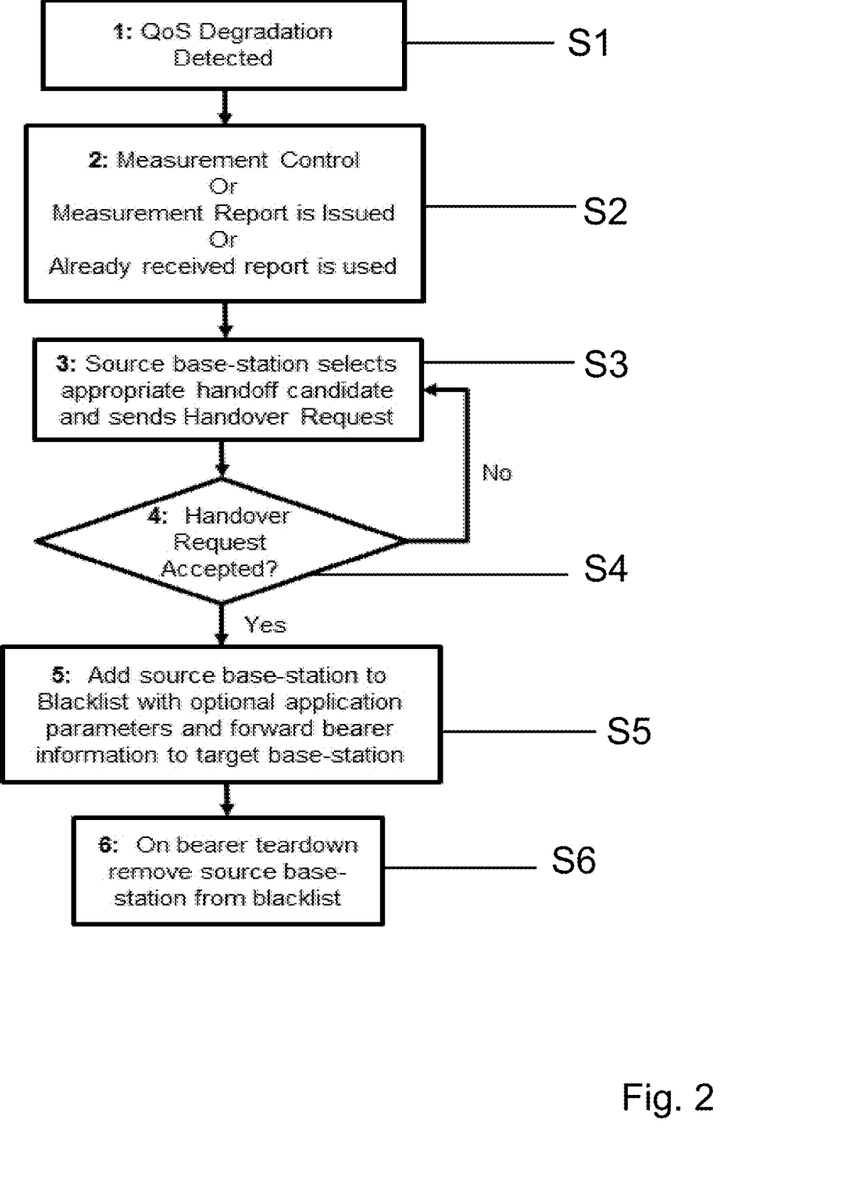
FIG. 2 shows a flow chart of the method according to a second embodiment of the present invention.

FIG. 2 shows a flow chart of the method according to a second embodiment of the present invention.

In FIG. 2 is shown a high level flow chart of a handover mechanism for a network centric approach. Network centric approach means, that a network entity obtains or gets information regarding a degradation or deterioration in the connection quality of a backhaul connection and network nodes are responsible for managing modification of a blacklist on the user equipment.

In a first step S1 a quality of service degradation is detected by a core network entity.

In a second step S2 a measurement control is performed or a measurement report is issued or an already received measurement report is used for getting al list of alternative base stations. Measurement control means that a measurement control message is issued to which the user equipment will respond with a measurement report including a list of alternative base stations.

In a third step S3 the source base station, i.e. the base station to which the user equipment is connected at the moment, selects an appropriate handoff candidate, i.e. an alternative base station, and sends a handover request to the handoff candidate.

In a fourth step S4 the handoff candidate base station accepts the handover request from the source base station or not. If not, the step S3 is performed again, i.e. selecting an other alternative appropriate handoff candidate by the source base station if available and then again sending a corresponding handover request.

If the handover request is accepted by the appropriate handoff candidate base station the source base station is added in a fifth step S5 to a blacklist with optional application parameters and bearer information is forwarded to the handoff candidate, i.e. a target base station. In addition, a condition rule when to remove the source base station from the blacklist again is given to the target base station. Such a condition may depend on the termination of an application, the teardown of a specific bearer, time based or any other appropriate event.

In a sixth step S6 the source base station is removed from the blacklist when the condition given in step S5 is met, e.g., the bearer is torn down.

Figure 3:
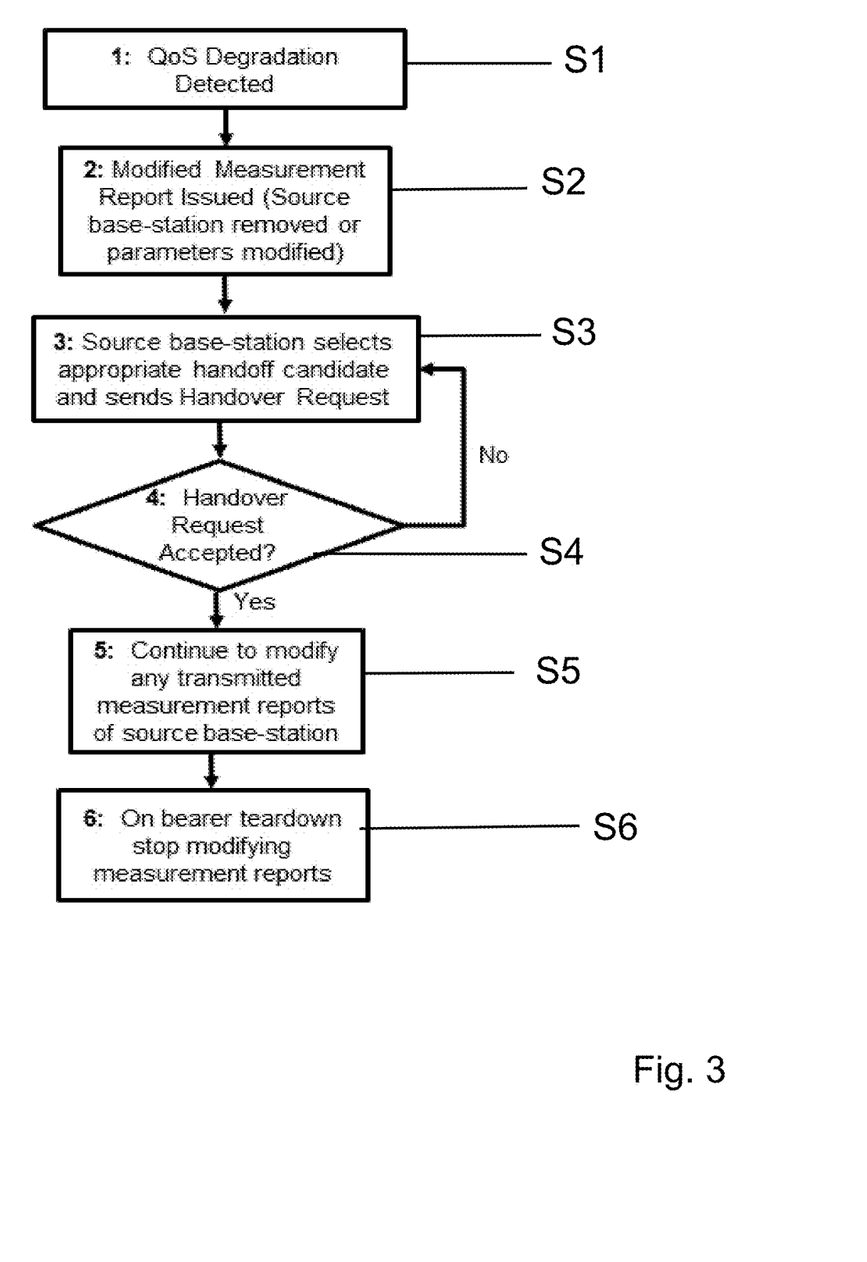
FIG. 3 shows a flow chart of the method according to a third embodiment of the present invention.

FIG. 3 shows a flow chart of the method according to a third embodiment.

FIG. 3 shows a high level flow chart of a handover mechanism according to a terminal centric approach. Terminal centric approach means that a degradation or deterioration in the connection quality in the backhaul connection is detected by the user equipment and temporary handoff is managed by the user equipment.

In a first step S1 a quality of service degradation is detected by the user equipment by monitoring application parameters.

In a second step S2 a modified measurement report is issued, wherein the source base station is removed from this report or corresponding parameters are modified. The modified measurement report including alternative base stations is then transmitted to the source base station.

In a third step S3 the source base station then selects an appropriate handoff candidate and sends a handover request to the appropriate handoff candidate respectively an alternative base station.

In a fourth step S4 the handoff candidate accepts the handover request from the source base station or not. If not, the third step S3 is performed again and the source base station selects another alternative appropriate handoff candidate if available and sends again a corresponding handover request to the alternative appropriate handoff candidate.

If the handover request of the fourth step S4 is accepted in a fifth step S5 any transmitted measurement reports of the source base station are continuously modified to prevent handback of the user equipment to the source base station.

In a sixth step S6 the user equipment will stop to issue modified measurement reports on bearer teardown and will then be handed back to the source base station.

Figure 4:
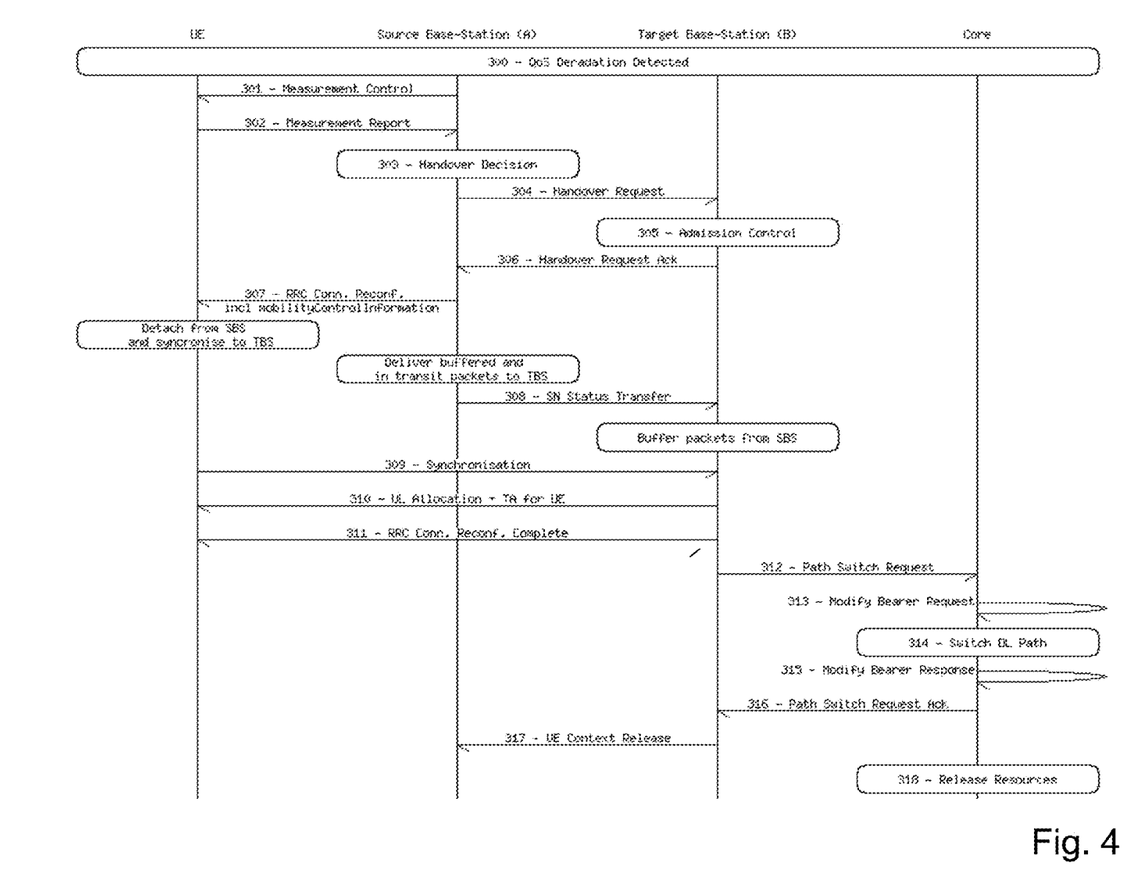
FIG. 4 shows a schematic view of a method according to a fourth embodiment of the present invention.

FIG. 4 shows a schematic view of a method according to a fourth embodiment of the present invention.

In FIG. 4 a user equipment handover procedure from a source base station (FBS in FIG. 1) to a target base station (macro base station MBS in FIG. 1) is shown. The term "core" defines one of the core network entities in FIG. 1, namely the mobility server MS, the femtocell gateway FGW and/or the packet data gateway PGW.

Reference sign 300 denotes the step of detecting a quality of service degradation. In the user equipment centric approach the user equipment UE obtains information regarding degradation in the backhaul link quality or its ability to support user flows at a reasonable level of quality. In the network centric approach a network entity obtains information regarding degradation in the backhauling quality. Degradation of the backhaul link quality may occur, for example in the case of a femtocell deployment, due to congestion on the fixed line connection being used to connect the femtocell base station (FBS) via the Internet to the core network CN.

On detection or indication of a potential quality degradation of the connection quality a measurement control message (reference sign 301) is transmitted from the source base station FBS to the user equipment UE.

The user equipment UE will respond to the measurement control message and sends a measurement report (reference sign 302) back to the source base station FBS. This measurement report message is modified with the current source base station FBS being removed or the parameters modified, essentially blacklisting the source base station FBS. Either it is assumed that there is an alternative base station (target base station MBS) with which the user equipment UE may establish a radio link. A list of alternate candidate base stations at the user equipment UE is already available, since the user equipment UE has this information as it is used for normal measurements reports. The source base station FBS now utilizes the measurement report and the source base station FBS will preauthorize handoff candidate base stations based on a combination of radio link quality between the user equipment UE and each base station FBS, MBS in case of the network centric approach.

In case of the user equipment's centric approach the source base station FBS will attempt to perform a handover (reference sign 303) to the alternative base station MBS. The selected alternative base station MBS will be the one for which the user equipment UE indicated and have the best radio link quality in the measurement report. Since the source base station FBS was not included in this list, the alternative base station MBS will be selected. In case of a network centric approach the source base station FBS will preauthorize handoff candidate base stations MBS based on a combination of radio link quality between the user equipment UE and each of the base stations MBS. This preauthorization may also incorporate the resource availability and backhaul link capacities of each alternative base station MBS if such information is available.

After a handover has been decided the source base station FBS initiates a handover mechanism (reference signs 304-318) between the source base station FBS and the target base station MBS: Once the alternative base station MBS has been selected, the source base station FBS will issue a handover request (reference sign 304) to the selected target base station MBS. This handover request may be extended to contain information regarding reasons for the handover request, for example the information "application quality degradation" and may also contain an identifier, so that the target base station MBS may identify the specific application, for example 5-tuple, or bearer, for example traffic class, that was degraded.

The target base station MBS performs an admission control (reference sign 305). If the handover request is rejected, then the source base station FBS will select the next best candidate handover base station and issues again a corresponding handover request.

If the handover request is successful, the target base station MBS issues a handover request acknowledging message (reference sign 306) to the source base station FBS.

The source base station FBS then instructs the user equipment UE to immediately perform the handover using a Radio Resource Control (RRC) connection reconfiguration message in a Long-Term Evolution (LTE) wireless network including mobility control information (reference sign 307). In this case the source base station FBS also instructs the user equipment UE to blacklist it, thereby preventing the user equipment UE from measuring this specific source base station FBS in measurement reports to the target base station MBS. In case of an LTE network, this information can be included in the RRC reconfiguration message using the IntraFreqBlackCellList and InterFreqBlackCellList in SystemInformationBlockType 4 or 5 respectively.

The user equipment then detaches from the source base station FBS and synchronizes to the target base station MBS. The source base station FBS then delivers buffered and in-transit packets to the target base station MBS to avoid packet loss. The source base station FBS then sends a source base station status transfer message to the target base station MBS (reference sign 308). The target base station MBS buffers the received buffered and in-transit packets from the source base station FBS.

The user equipment UE synchronizes then with the target base station MBS (reference sign 309).

The target base station MBS responds with upload allocation and timing advance for the user equipment (reference sign 310).

Alternatively the handover to the target base station MBS could be first completed and immediately the target base station MBS would instruct the user equipment UE to blacklist the source base station FBS. When the user equipment UE has successfully accessed the target base station MBS the user equipment UE sends an RRC connection reconfiguration complete message in an LTE wireless network to confirm the handover along with an uplink buffer status report to the target base station MBS (reference sign 311) to indicate that the handover procedure is completed for the user equipment UE. The target base station MBS receives the RRC connection reconfiguration complete message. This prevents an immediate handback of the user equipment UE to the source base station FBS until specific criteria are met, for example applications requiring higher levels of quality of service than can be met by the source base station FBS are no longer in use.

The target base station MBS sends a path switch request message to the core to inform that the user equipment UE has changed the cell respectively the base station (reference sign 312).

The core modifies the bearer request (reference sign 313), switches the downlink data path to the target base station (reference sign 314), modifies the bearer response (reference sign 315) and further the core sends a path switch message with the path switch acknowledge message to the target base station MBS (reference sign 316).

The target base station MBS informs success of the handover to the source base station FBS by sending user equipment context release (reference sign 317), triggering the release of resources by the source base station FBS. The target base station MBS sends this message after the path switch acknowledge message is received from the core.

Upon reception of the user equipment context release message (reference sign 317) the source base station can release radio and C-plane related resources associated to the user equipment context (reference sign 318). Any ongoing data forwarding may continue then.

As previously the user equipment UE or a network entity may continuously monitor an ongoing application, for example using flow based detection (5-tuple) or monitoring of control plane exchanges such as Session Initiation Protocol (SIP), Real-time Transport Control Protocol (RTCP), Real Time Streaming Protocol (RTSP), etc. or bearers (for example General Packet Radio Service Tunnelling Protocol (GTP)-U-tunnels) which suffered quality degradation and on which the handover from the source base station FBS to the target base station MBS was based obtained via the modified handover request. As long as these flows or bearers remain active, the source base station FBS will be blacklisted. This means that any measurement reports transmitted to the target base station MBS will contain no reference to the source base station FBS thereby preventing a handback.

When the flow or bearer are no longer active, the target base station MBS will instruct the user equipment UE to remove the source base station FBS from its blacklist. On removal of the source base station FBS from the user equipment's blacklist the user equipment UE will begin sending normal unmodified measurement reports to the target base station MBS. If the user equipment UE is still in the coverage area of the source base station FBS and has a better radio link to that source base station FBS than to any other, then the normal handover mechanism will cause the user equipment UE to handback to the source base station FBS.

Alternatively, measurements concerning quality of service and/or quality of experience may be done on the user equipment while blacklist handling is done by the target base station. Alternatively, the measurements may also be done by the source base station FBS and the blacklist handling is executed by the user equipment UE. A general principle of the alternative is, that some steps of the aforementioned method are placed on the user equipment while others are placed on the source and/or target base station.

Figure 5:
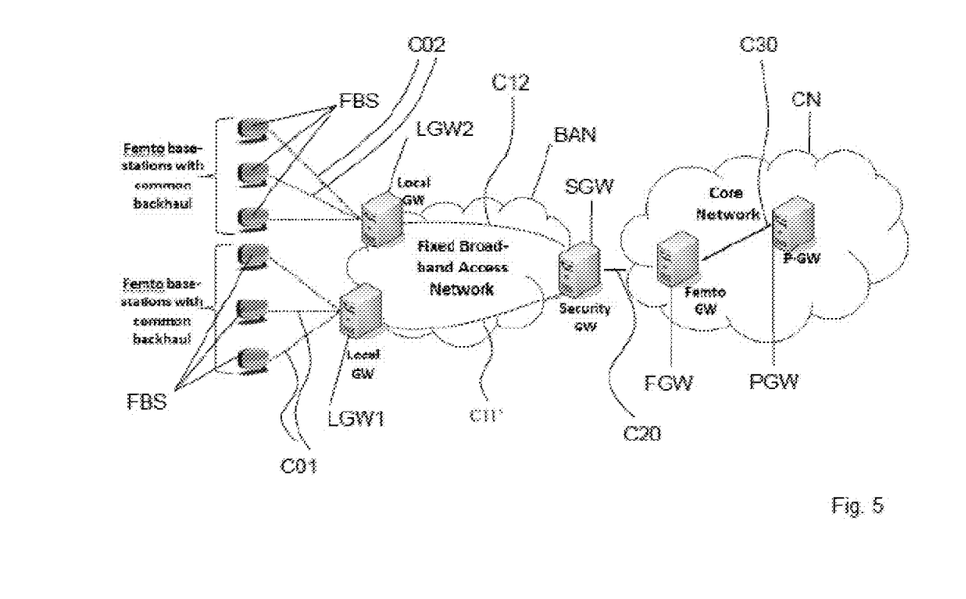
FIG. 5 shows a system according to a fifth embodiment of the present invention.

FIG. 5 shows a system according to a fifth embodiment of the present invention.

FIG. 5 shows a core network CN comprising a femtocell gateway FGW connected via a connection C30 to a packet data gateway PGW. Further, the femtocell gateway FGW is connected via a connection C20 to a security gateway SGW. The security gateway SGW is connected via a fixed broadband access network BAN with connection C11, C12 to two local gateways LGW1 and LGW2. Each local gateway LGW1 and LGW2 is connected via a connection C01, C02 to a plurality of femtocell base stations FBS. In FIG. 5 each local gateway LGW1, LGW2 is connected to three femtocell base stations FBS. A switching over of a user equipment UE from a femtocell base station FBS connected to the first local gateway LGW1 to a femtocell base station FBS which is also connected to the first local gateway LGW1 would not solve a quality problem when the handover was due to quality degradation in the connection between the femtocell base station FBS and the packet data gateway PGW via the first local gateway LGW1, since also the handed over femtocell base station suffers the same resource constrained in the backhaul connection, since the target femtocell base station FBS is also connected to the first local gateway LGW1.

In FIG. 5 each femtocell base station FBS is connected to the femtocell gateway FGW via an IPSec tunnel routed over the local gateways LGW1, LGW2, a fixed broadband access network BAN and a security gateway SGW. In FIG. 5 it is assumed that multiple femtocell base stations as part of the same enterprise network will utilize the same local gateway LGW1, LGW2 and that address translation is performed at the local gateway LGW1, LGW2. This enables the femtocell gateway FGW to group femtocell base stations FBS based upon the source IP address of the IPSec tunnel for each. If a user equipment UE connected to a femtocell base station FBS suffers a quality of service and/or quality of experience problems a femtocell gateway FGW rather than simply blacklisting each individual femtocell base station FBS on which the quality issues were experienced could be instead be instructed to blacklist all femtocell base stations FBS in the same group, i.e. connected to the same local gateway LGW1, LGW2. When detecting a quality degradation, the femtocell gateway FGW observes the source IP address of the IPSec tunnel between each femtocell base station FBS and the femtocell gateway FGW and provide corresponding information to the femtocell base station FBS with a list of all other femtocell base stations FBS sharing the same backhaul connection resource.

Figure 6:
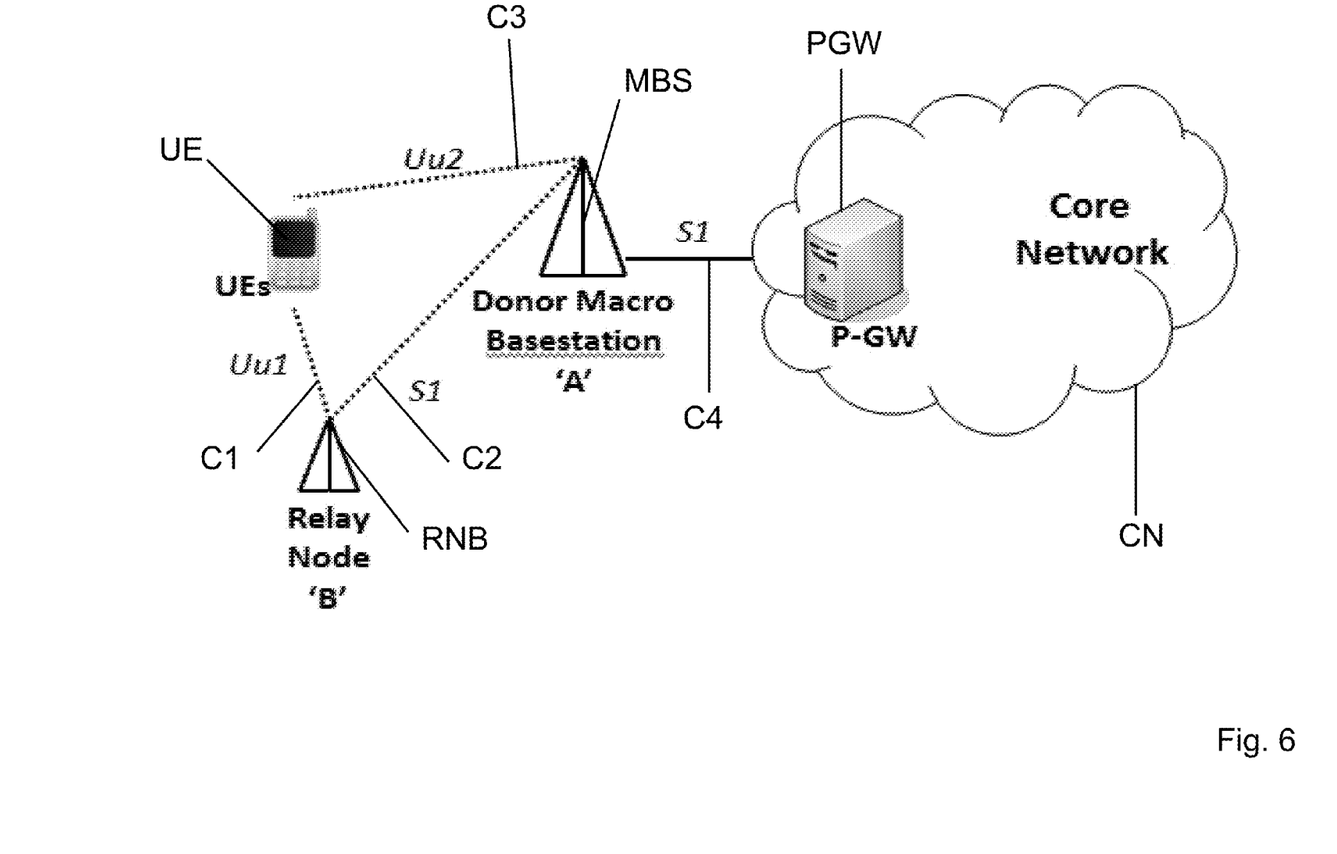
FIG. 6 shows a system according to a sixth embodiment of the present invention.

FIG. 6 shows a system according to a sixth embodiment of the present invention.

FIG. 6 shows an example for a relay architecture incorporating a relay node. FIG. 6 is based upon the Evolved Universal Mobile Telecommunications System Terrestrial Radio Access Network (E-UTRAN) architecture, however, does not exclude legacy or future relay architectures. In FIG. 6 it is assumed that the user equipment UE is in an overlapping coverage area of both a donor macrocell base station MBS and a relay base station or relay node RNB. Initially the user equipment UE is connected via a first connection C1 to the relay base station RNB. The relay base station RNB is connected via a second connection C2 to the donor macrocell base station MBS and further the donor macrocell base station MBS is connected via a fourth connection C4 to the packet data gateway PGW in a core network CN.

Initially the user equipment UE is connected to the relay base station RNB via the first connection C1. If the user equipment UE requests a bearer for which the relay backhaul link, i.e. the second connection C2 between the relay base station RNB and the donor macrocell base station MBS, cannot meet the quality requirements, i.e. the capacity of the backhaul link C2 is the bottleneck just like a DSL-link in a femtocell base network, then this bearer request would simply be denied.

Assuming that the donor macrocell base station MBS has sufficient capacity the user equipment UE is handed off to the donor macrocell base station MBS and the user equipment UE is then connected via a third connection C3 directly to the donor macrocell base station MBS. On reception of the bearer request the relay node base station RNB does not immediately reply to deny the request. A measurement control message is send to the user equipment UE requesting a measurement report. On reception of the measurement report, the relay node base station RNB selects a candidate target base station, for example the donor macrocell base station MBS and sends a handover request to the donor macrocell base station MBS. If this request is accepted by the donor macrocell base station MBS the relay node base station RNB sends a message accepting the initial user equipment bearer request to the user equipment UE and sends a further message instructing the user equipment UE to blacklist it and at the same time sends a handover message instructing the user equipment UE to handover to the target base station in form of the donor macrocell base station MBS. This provides load balancing between relay nodes and macro-cellular entities while providing better quality of service and/or quality of experience for end-users. Further call blocking probabilities during periods of congestion are reduced.

In summary the present invention enables handover control in cellular networks based on selected control of blacklisted base stations and the user equipment and/or measurement report modification. These handover and blacklisting decisions may be based upon backhaul resource monitoring and/or application, transport session and flow usage. Ongoing quality of application and/or flow is monitored and if quality degradation is detected a handover decision is made. The decision to handover and to monitor backhaul resources may be implemented in the user equipment, in a (core) network entity or a combination of both in which modification to both the user equipment and the network entity is performed.

The user equipment or a base station modifies measurement reports to modify or remove an entry for a specific base station or set of base stations in order to trigger a handover from a particular base station or to prevent handover to a specific base station or set of base stations.

In the case of a femtocell deployment it is preferred not to only blacklist the specific base station over which quality degradation was experienced but to blacklist all femtocell base stations using the same (congested) blackhaul link. The blacklists and the user equipment are controlled at the user equipment or through signalling from a (core) network entity to prevent specific base stations from being included in measurement reports. This can be accomplished through existing mechanisms using the RRC reconfiguration message defined according to 3GPP standard release 10. Modified measurement reports or an in-network decision triggers a handover to an alternative base station. A handover request sent to the target base station may be modified in order to provide information about the specific application suffering quality degradation or the congested backhaul. After successful completion of a handover to an alternative base station the user equipment or a (core) network entity may continue to monitor the specific application, flow or session. On completion of this session, application or flow, the user equipment or the network entity may remove the source base station or set of base stations from the blacklist.

The present invention enables a quality of service based handover from femtocell base stations due to their limited backhaul capabilities and preventing immediate hand-back through measurement report modifications and dynamic control of blacklists. The present invention further provides preventing handovers to base stations utilizing the same congested backhaul link over which quality degradation was experienced. The present invention further provides enabling of handback of a user equipment to a femtocell base network when specific application, session or flow is no longer in use reducing congestion on macro-cellular network.

The present invention has inter alia the following advantages: The present invention adds much more dynamic and intelligent handover procedure for femtocell based networks to the 3GPP handover process. The present invention prevents handover to femtocells utilizing the same congesting backhaul that causes the quality degradation that triggered the handover. The present invention improves end-user experiences while minimizing load on macro-cellular networks.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for handover of a user equipment in a femtocell network, the method comprising:
   using a user equipment and at least two base stations, each base station being assigned to a cell, coverage areas of at least two neighboring cells being at least partly overlapping, the user equipment being connected to one of the base stations, the one of the base stations being in a form of a femtocell base station, the at least two base stations each being connected via a backhaul connection to a core network device, located in a core network;
   a) detecting a deterioration of a predetermined connection quality by the user equipment for an application on the network connection path between the user equipment and the core network device via the connected base station;
   b) providing backhaul connection information about at least one alternative base station providing at least the predetermined connection quality on its backhaul connection for the application;
   c1) blacklisting the connected base station on the user equipment by providing a measurement report, the measurement report being modified by modified or removed information of the connected base station;
   c2) providing a removing condition as to when to remove the connected base station from the blacklist;
   d1) requesting a handover of the user equipment from the connected base station to the alternative base station;
   d2) handing over the user equipment to the alternative base station when a handover request according to step d1) is accepted; and
   e) handing back the user equipment to the previously-connected base station when the removing condition according to step c2) is fulfilled, and by deblacklisting the previously-connected base station by providing an un-modified measurement report including information about the previously-connected base station.

2. The method according to claim 1, wherein the user equipment relays the backhaul connection information of neighboring cells to its connected base station according to step b).

3. The method according to claim 1, wherein additionally a core network entity detects a deterioration according to step a).

4. The method according to claim 3, wherein the core network entity performs deep packet inspection for detecting a deterioration according to step a).

5. The method according to claim 1, wherein backhaul connection information is provided by a backhaul provider, the backhaul connection information provided by the backhaul provider being alternatively or additionally used to detect a deterioration in the provided connection quality.

6. The method according to claim 1, wherein the removing condition according to step c2) includes application activity information and/or deblacklisting timing information and/or bearer or IP flow information.

7. The method according to claim 1, wherein the connection quality includes quality of service information and/or a quality of experience information.

8. The method according to claim 1, wherein the handover according to step d) is performed to an alternative base station having a different backhaul connection than the core network device.

9. The method according to claim 1, wherein the backhaul connection information is provided by each of the base stations and exchanged between different neighboring base stations.

10. The method according to claim 9, wherein the backhaul connection information is exchanged via an X2-like interface between the base stations and/or via a database storing backhaul connection information of the different base stations and/or via a report transmitted to the connected base station,
   wherein the user equipment adds the backhaul connection information to the request.

11. The method according to claim 8, wherein step c) is performed for all base stations having the same backhaul connection as the connected base station.

12. The method according to claim 1, wherein the connected base station is provided in a form of a relay node, the relay node being connected to the at least one alternative base station.

13. The method according to claim 1, wherein step c) is performed by removing the connected base station from a measurement report transmitted to the connected base station.

14. The method according to claim 1, wherein a core network entity obtains the backhaul connection information by observing a source Internet Protocol (IP) address of an Internet Protocol Security (IPsec)-tunnel between a base station and the core network entity,
   wherein the core network entity is provided in a form of a femtocell gateway.

15. A system for handover of the user equipment in the femtocell network, the system configured to perform the method according to claim 1, the system comprising:
   the user equipment; and
   the at least two base stations, each base station being assigned to the cell, the coverage areas of the at least two neighboring cells being at least partly overlapping, the user equipment being connected to the one of the base stations in the form of the femtocell base station, the at least two base stations each being connected via the backhaul connection to the core network device, located in the core network, wherein the user equipment includes one or more processors configured to detect the deterioration of the provided connection quality compared to the predetermined connection quality for the application in the backhaul connection on the network connection path between the user equipment and the core network device via the connected base station, to provide backhaul connection information about the at least one alternative base station providing at least the predetermined connection quality on its backhaul connection for the application, to blacklist the connected base station on the user equipment by providing a measurement report, the measurement report being modified by modified or removed information of the connected base station, to provide the condition as to when to de-blacklist the connected base station from the blacklist, and to remove the previously-connected base station by providing an un-modified measurement report including information about the previously-connected base station, and to request the handover, to handover the user equipment from the connected base station to the alternative base station when a requested handover is accepted, and to handback the user equipment to the previously-connected base station.

16. The system according to claim 15, wherein the connected base station is provided in a form of a relay station of the alternative base station.

17. The method according to claim 2, wherein a core network entity and/or the user equipment detects a deterioration according to step a).

18. The method according to claim 2, wherein backhaul connection information is provided by a backhaul provider, the backhaul connection information provided by the backhaul provider being alternatively or additionally used to detect a deterioration in the provided connection quality.

19. The method according to claim 3, wherein backhaul connection information is provided by a backhaul provider, the backhaul connection information provided by the backhaul provider being alternatively or additionally used to detect a deterioration in the provided connection quality.

20. The method according to claim 4, wherein backhaul connection information is provided by a backhaul provider, the backhaul connection information provided by the backhaul provider being alternatively or additionally used to detect a deterioration in the provided connection quality.

* * * * *